United States Patent [19]
West et al.

[11] Patent Number: 5,115,767
[45] Date of Patent: May 26, 1992

[54] HIGH EFFICIENCY INSULATED WATER HEATER AND METHOD FOR MAKING SAME

[75] Inventors: Eugene L. West; David H. Beck, both of Grand Rapids; Thomas L. Gort, Wyoming, all of Mich.

[73] Assignee: Bradford-White Corporation, Philadelphia, Pa.

[21] Appl. No.: 746,282

[22] Filed: Aug. 9, 1991

[51] Int. Cl.$^5$ .............................................. F22B 37/36
[52] U.S. Cl. .................................... 122/494; 126/363; 220/445; 122/13.1
[58] Field of Search ................... 122/494, 13.1, 18, 19, 122/14; 126/361, 363; 392/441; 220/445, 447

[56]  References Cited

U.S. PATENT DOCUMENTS

| | | | |
|---|---|---|---|
| 1,072,105 | 9/1913 | Englund | 220/445 |
| 3,392,220 | 7/1968 | Jennings . | |
| 3,793,411 | 2/1974 | Stonitsch et al. . | |
| 4,372,028 | 2/1983 | Clark et al. . | |
| 4,447,377 | 5/1984 | Denton . | |
| 4,452,226 | 6/1984 | Daugirda et al. | 126/363 |
| 4,477,399 | 10/1984 | Tilton . | |
| 4,527,543 | 7/1985 | Denton | 126/361 |
| 4,628,184 | 12/1986 | West . | |
| 4,632,792 | 12/1986 | Clark . | |
| 4,860,728 | 8/1989 | Nelson | 126/361 |
| 4,964,529 | 10/1990 | Houston | 220/445 |
| 4,972,967 | 11/1990 | Nelson | 126/361 |

FOREIGN PATENT DOCUMENTS 158028  1/1921  United Kingdom ................. 22/445

*Primary Examiner*—Carroll B. Dority
*Attorney, Agent, or Firm*—Austin R. Miller

[57]  ABSTRACT

A high-efficiency insulated water heater including a base pan having a bottom portion with cut-out holes. Feet are positioned in the cut-outs having an upper portion extending above the bottom of the pan. The upper portions of the feet have inclined centering surfaces arranged for contacting and centering the water tank substantially equidistant from the outer edge of the base pan. The water tank has a lower edge engaging the centering surfaces of the feet. A method of producing a high-efficiency insulated water heater including the steps of forming a plurality of cut-outs in the bottom of the base pan having an outer edge, inserting feet into the cut-outs in such a way that the feet have upper portions extending above the bottom of the pan and lower portions extending below the bottom of the pan and wherein the upper portions of the feet have inclined centering surfaces located substantially equidistant from the base pan outer edge. The bottom of the water tank is then positioned over the base pan and within a retaining wall extending around the outer edge of the base pan, the tank being lowered into engagement with the centering surfaces of the feet. An outer jacket is positioned around the water tank and into engagement with the base pan retaining wall to form an intervening annular space. Insulation material is then introduced into the concentrically-oriented annular space.

21 Claims, 6 Drawing Sheets

HIGH EFFICIENCY INSULATED WATER HEATER AND METHOD FOR MAKING SAME

This application is a continuation of application Ser. No. 07/621,621, filed Dec. 3, 1990, and now abandoned.

BACKGROUND OF THE INVENTION

This invention relates to a high efficiency insulated water heater, particularly to a water heater having an insulation layer of substantially even thickness, and further relates to a method for making the same.

DISCUSSION OF THE PRIOR ART

It is known in the art to construct water heaters with a layer of foam insulation, such as polyurethane foam, in attempting to achieve high thermal efficiency in heating water. Such water heaters are disclosed in U.S. Pat. Nos. 4,372,028; 4,447,377; 4,477,399; 4,527,543; 4,628,184; 4,632,792 and 4,808,356, for example.

It has been discovered in various foaming procedures that it is difficult to maintain the water tank contained within the water heater concentrically positioned with respect to the outer jacket during foaming. Foaming operations typically involve injection of foam forming materials into a space with generation of irregular high pressures between the water tank and outer jacket.

Although it is not overly difficult to concentrically align the water tank and outer jacket prior to foaming, the step of injecting the foam forming materials and the subsequent violent reaction occurring between the tank and the jacket tends to laterally move or slide the water tank or the jacket out of its concentric position. This movement surprisingly occurs despite the weight of the water tank—which is typically constructed of heavy material such as steel.

The relative movement between tank and jacket creates an irregular space from place to place around the water heater. This results in an insulative layer part of which has a thickness well beyond that necessary to achieve high thermal insulation and another part of which has an insulation thickness far smaller than that necessary to achieve a thermally efficient water heater.

The problem caused by variation of foam thickness around the heater is especially acute in water heaters having a small designed insulation thickness such as one inch or less. Water tank movement of only $\frac{1}{4}$ to $\frac{1}{2}$ of an inch can be severely detrimental to the thermal efficiency of such a water heater.

U.S. Pat. No. 4,808,356, issued to and owned by the assignee hereof, discloses a method for insulating water heaters utilizing a centering template attached to an uppermost edge of the outer jacket which engages hot and cold water nipples extending upwardly from the water tank. This novel method and apparatus has proven to be quite effective in maintaining concentricity of the water tank within the jacket in the upper portion but not necessarily in the lower portion of the space to be foamed.

Other attempts to solve the difficult problem of maintaining concentricity of the lower portions of tanks and jackets of water heaters have not been entirely successful. For example, U.S. Pat. No. 4,372,028 attempts to solve the lower area concentricity problem by utilizing a foam-filled bag surrounding the water tank prior to positioning the outer jacket around the water tank. The bag has many inherent problems which are magnified on the assembly line during mass production. The bag must first be filled with foam, which adds an entirely new foaming operation to the assembly line procedure. Then, a period of time passes before the bag can completely fill. It is also possible during filling that the bag will break, thereby causing further problems. An additional person is typically needed to apply the bag around the water tank. It is also possible for the outer jacket to catch on and rip the foam bag, thereby leading to spilled foam and a useless bag. Also, due to the flexibility of the bag, it is frequently difficult to quickly position the outer jacket around the bag in view of the close tolerances and desired high speed of manufacture on the assembly line. Proper jacket and tank alignment is further complicated since the flat bottom of the water heater tends to slide or shift positions on the assembly line.

U.S. Pat. No. 4,477,399 discloses another complicated method and apparatus which attempts to solve the lower concentricity problem. That method uses a tube positioned around the lower portion of the tank which may be filled with a gas, such as pressurized air, or liquids. This method and apparatus suffers and is confronted by problems and many of the same deficiencies as U.S. Pat. No. 4,372,028.

In entirely different fields, U.S. Pat. Nos. 3,392,220 and 3,793,411 disclose methods of insulating cylindrical structures in several different ways.

Another problem encountered in the manufacture of water heaters relates to how the finished product rests on a floor after installation. Frequently the surface of a floor is uneven, making it difficult to position the water heater in a stable rest position. Also, it is common for the bottom pan to corrode when resting on a floor due to collection and retention of water. The floor can further act as a heat sink since it usually has an ambient temperature lower than the water heater—which is detrimental to thermal efficiency. Feet have been designed to be placed on the bottom pans of water heaters in efforts to overcome these problems. However, fabrication and attachment of such feet is costly and cumbersome in both manufacture and shipment.

OBJECTS OF THE INVENTION

It is an object of the invention to provide a foamed and thermally efficient water heater, and to provide a method for making the same, wherein the water tank and outer jacket are concentrically maintained relative to one another.

It is another object of the invention to provide an insulated tank for a high efficiency water heater, and a method of making the same, wherein the insulation material has a substantially uniform thickness around the surface of the tank.

It is yet another object of the invention to provide a high efficiency water heater, and method for making the same, wherein the exterior of the water heater is aesthetically pleasing and which is free of distortions, bulges and deformities.

It is a further object of the invention to provide a thermally efficient water heater, and method for making the same, which can be installed on uneven floor surfaces, is protected from corrosion of the bottom portion of the waterheater proximate the floor and is thermally separated from the floor.

Other objects and advantages of the invention will become apparent to those skilled in the art from the drawings and the following description.

SUMMARY OF THE INVENTION

This invention provides a high efficiency insulated water heater including a laterally rigid base pan having a bottom portion with at least three cut-out holes. Feet are positioned in the cut-outs having an upper portion extending above the bottom of the pan. The upper portions of the feet have inclined centering surfaces arranged for contacting and centering the water tank substantially equidistant from the outer edge of the base pan. The water tank has a lower edge engaging the centering surfaces of the feet. The water heater further includes an outer jacket spaced outwardly of the water tank and connected to the outer edge of the base pan, and includes foam or other insulation material positioned within the concentrically shaped space formed between the water tank and the outer jacket.

The invention further provides a method of producing a high efficiency insulated water heater including the steps of forming a plurality of cut-outs in the bottom of a base pan having an outer edge. Feet are then inserted into the cut-outs in such a way that the feet have upper portions extending above the bottom of the pan and lower portions extending below the bottom of the pan and wherein the upper portions of the feet have inclined centering surfaces located substantially equidistant from the base pan outer edge. The bottom of the water tank is then positioned over the base pan and within a retaining wall extending around the outer edge of the base pan, the tank being lowered into engagement with the centering surfaces of the feet. An outer jacker is positioned around the water tank and into engagement with base pan retaining wall to form an intervening annular space. Insulation material is then introduced into the concentrically oriented annular space formed between the water tank and the outer jacket.

DETAILED DESCRIPTION OF THE INVENTION

Figure 1:
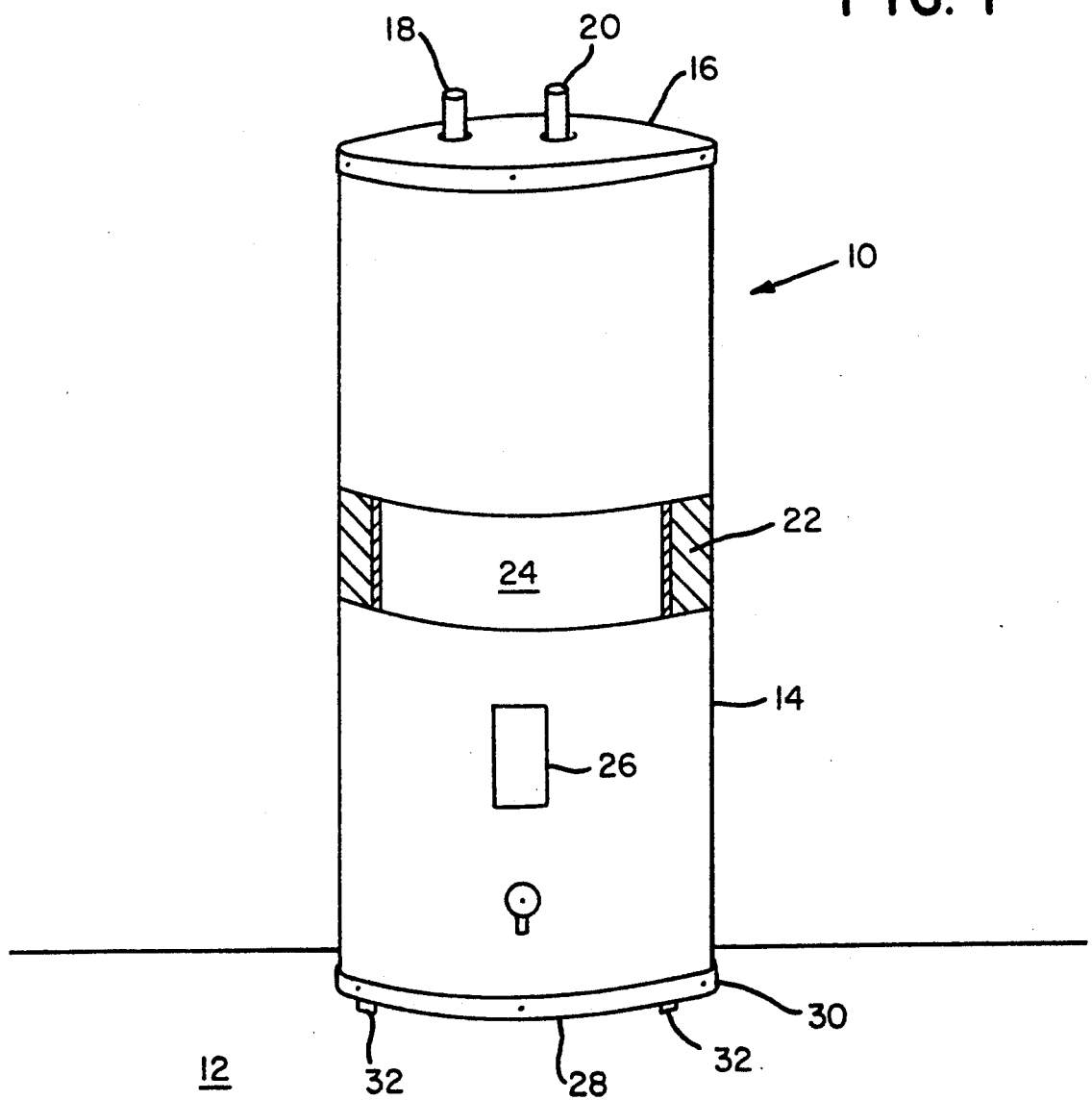
FIG. 1 shows a schematic front elevational view of a high efficiency water heater of the invention, with a portion broken away and taken in section for ease of understanding.

Although a particular form of apparatus and method has been selected for illustration in the drawings, and although specific terms will be used in the specification for the sake of clarity in describing the apparatus and method steps shown, the scope of this invention is defined in the appended claims and is not intended to be limited either by the drawings selected or the terms used in the specification or abstract.

Referring now to the drawings in general and FIG. 1 in particular, a thermally efficient water heater 10 is shown resting on feet 32 which rest upon floor 12. Water heater 10 includes outer jacket 14, top cover 16, cold water heater inlet 18 and hot water outlet 20. Inlet 18 and outlet 20 extend through top cover 16. Foam insulation 22 is disposed interiorly of outer jacket 14 and lies against water tank 24. Heating and control apparatus 26 is mounted to the wall of water tank 24 to supply heat to the water contained within water tank 24. Outer jacket 14 connects to base pan 28 having a (cylindrical) vertical retaining wall 30. Feet 32 extend downwardly from base pa 28 and lie directly against floor 12. Means are provided for heating the water in the tank, not shown, which may be any conventional gas or electrical heating means well known in the art.

Figure 2:
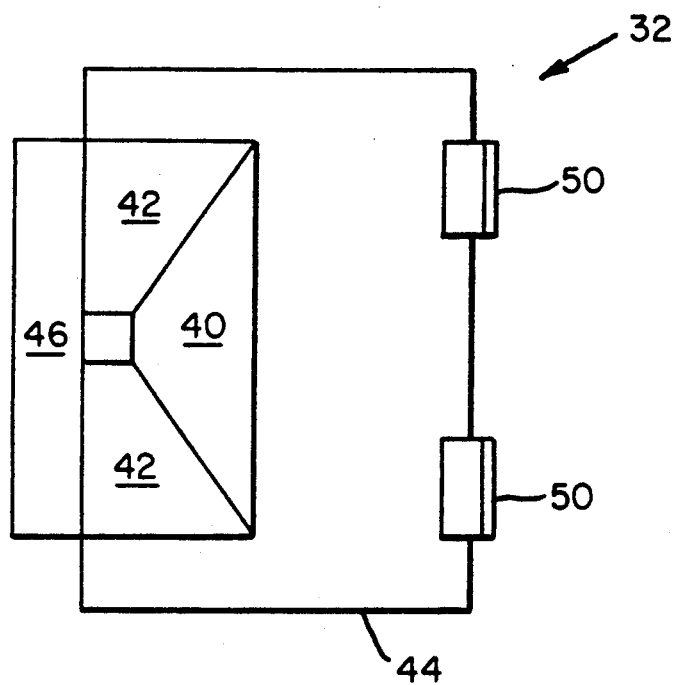
FIG. 2 is a top plan view of one form of foot in accordance with the invention.
Figure 3:
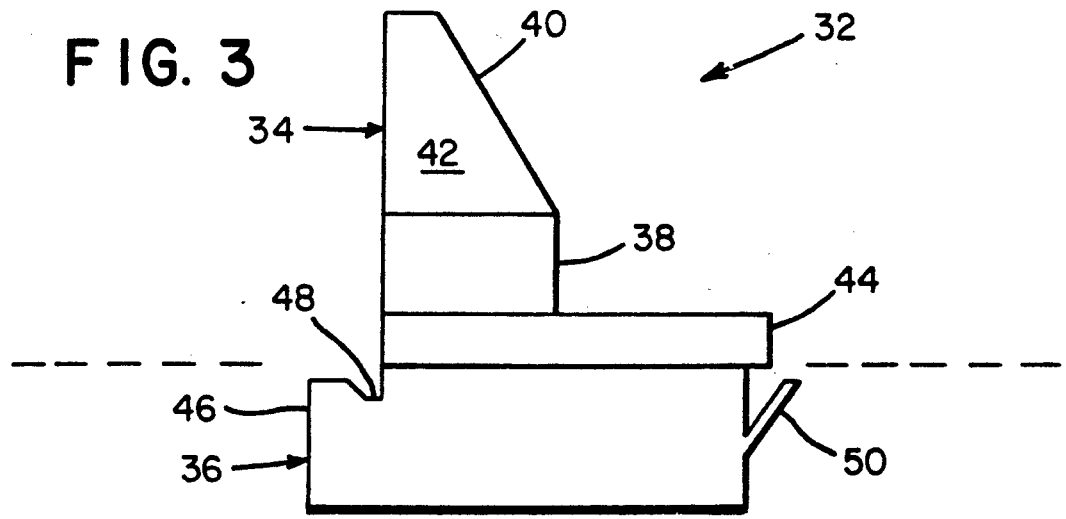
FIG. 3 is a side view of the foot illustrated in FIG. 2.
Figure 4:
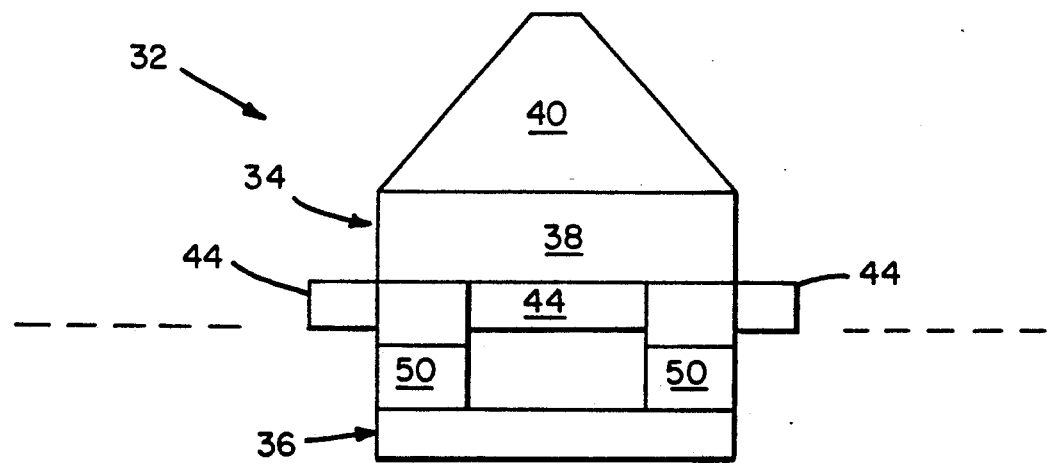
FIG. 4 is a front view of the foot illustrated in FIG. 2.

FIGS. 2, 3 and 4 show one preferred embodiment of a foot 32. Foot 32 has an upper portion 34 located above the dashed lines in FIGS. 3 and 4 and a lower portion 36 located below the dashed lines shown in FIGS. 3 and 4.

Upper portion 34 of foot 32 includes a centering surface wall 38, for centering water tank 24, an angled guide wall 40 and a pair of opposed angled side faces 42 (FIGS. 2 and 3). Upper portion 34 of foot 32 further includes a retaining flange 44 which extends laterally inwardly from the main body of foot 32 and which serves to retain the foot 32 in position with respect to the bottom pan of the water heater, as will be described in further detail hereinafter.

Lower portion 36 of foot 32 includes a pivot flange 46 having a groove 48 and flexible retaining arms 50, which are useful for the assembly of the foot 32 to the water heater as will be further described.

Figure 5:
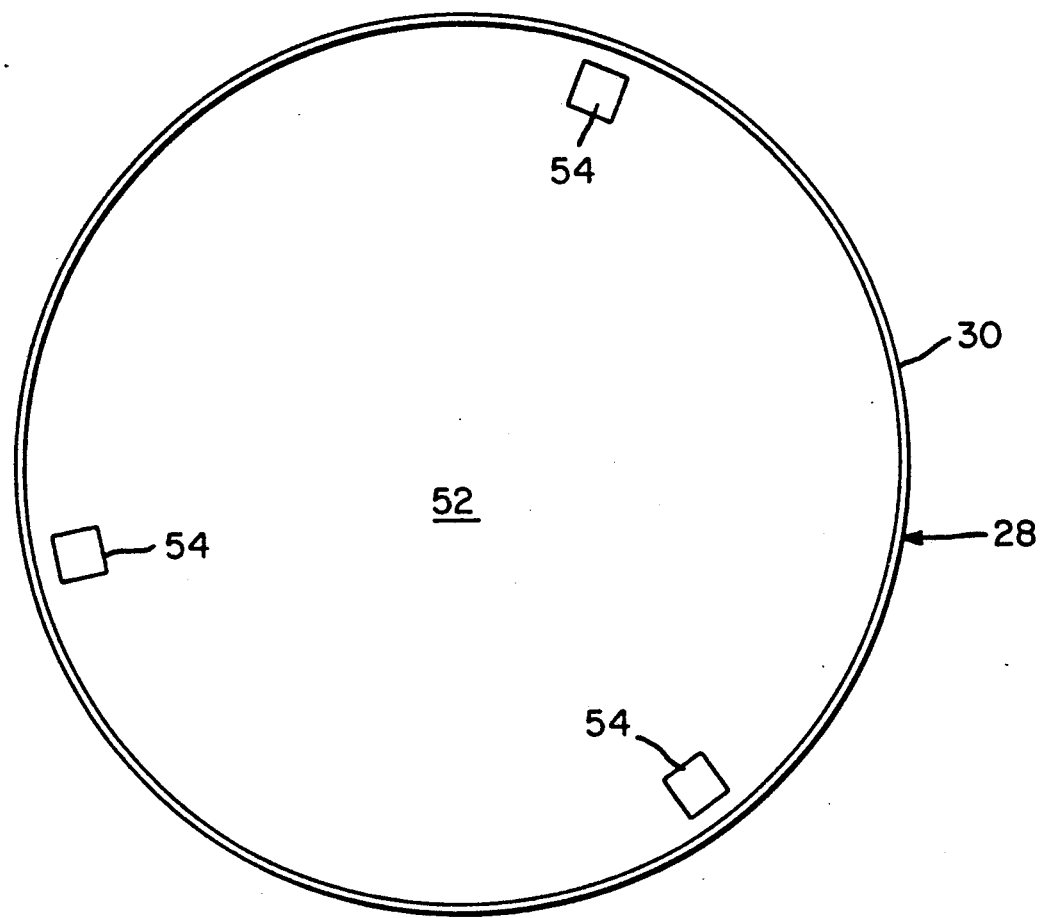
FIG. 5 is a top plan view of one form of base pan in accordance with the invention.

FIG. 5 illustrates one form of base pan 28 for the water heater and includes a vertical cylindrical retaining wall 30, a bottom plate 52 and spaced-apart cut-outs 54.

Figure 6:
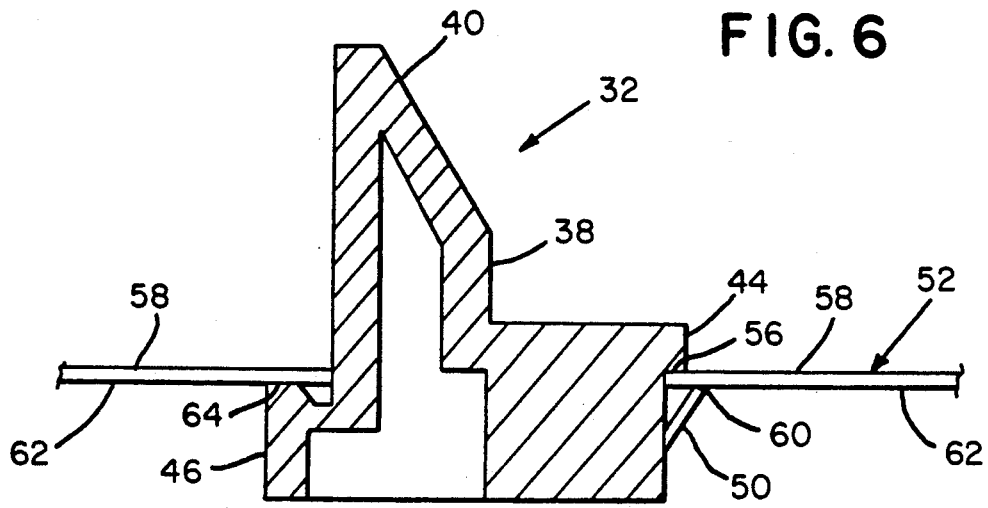
FIG. 6 is a partial sectional side view of the foot shown in FIGS. 2-4 inserted into the base pan shown in FIG. 5.

FIG. 6 shows the foot 32 snapped into place in the bottom plate 52 of base pan 28. The undersurface 56 of flange 44 engages the top surface 58 of base pan bottom portion 52. Similarly, the end 60 of flexible retaining arm 50 engages the lower surface 62 of base pan bottom plate 52. Also, the upper surface 64 of pivot flange 46 engages the base pan lower surface 62.

Figure 7:
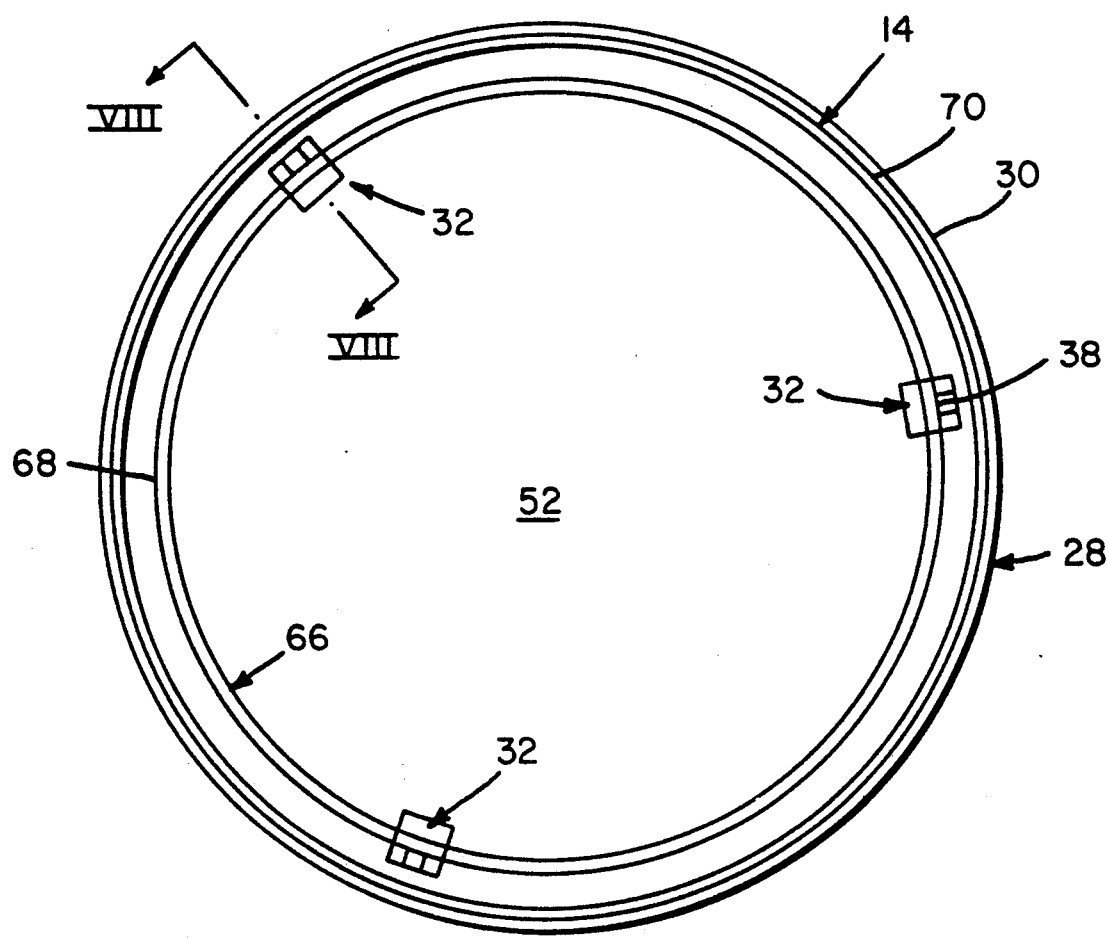
FIG. 7 is a sectional view looking toward the bottom of a water tank which includes tank engaging feet embodying features of this invention.

FIG. 7 shows three feet 32 snapped into place in cut-outs 54 of base pan 28. Lower edge 66 of water tank 24 engages feet 32. Specifically, outer surface 68 of lower edge 66 is confined in a concentric position by centering surface walls 38 of feet 32. Similarly, outer wall 70 of jacket 14 engages vertical side wall 30 of base pan 28.

Figure 8:
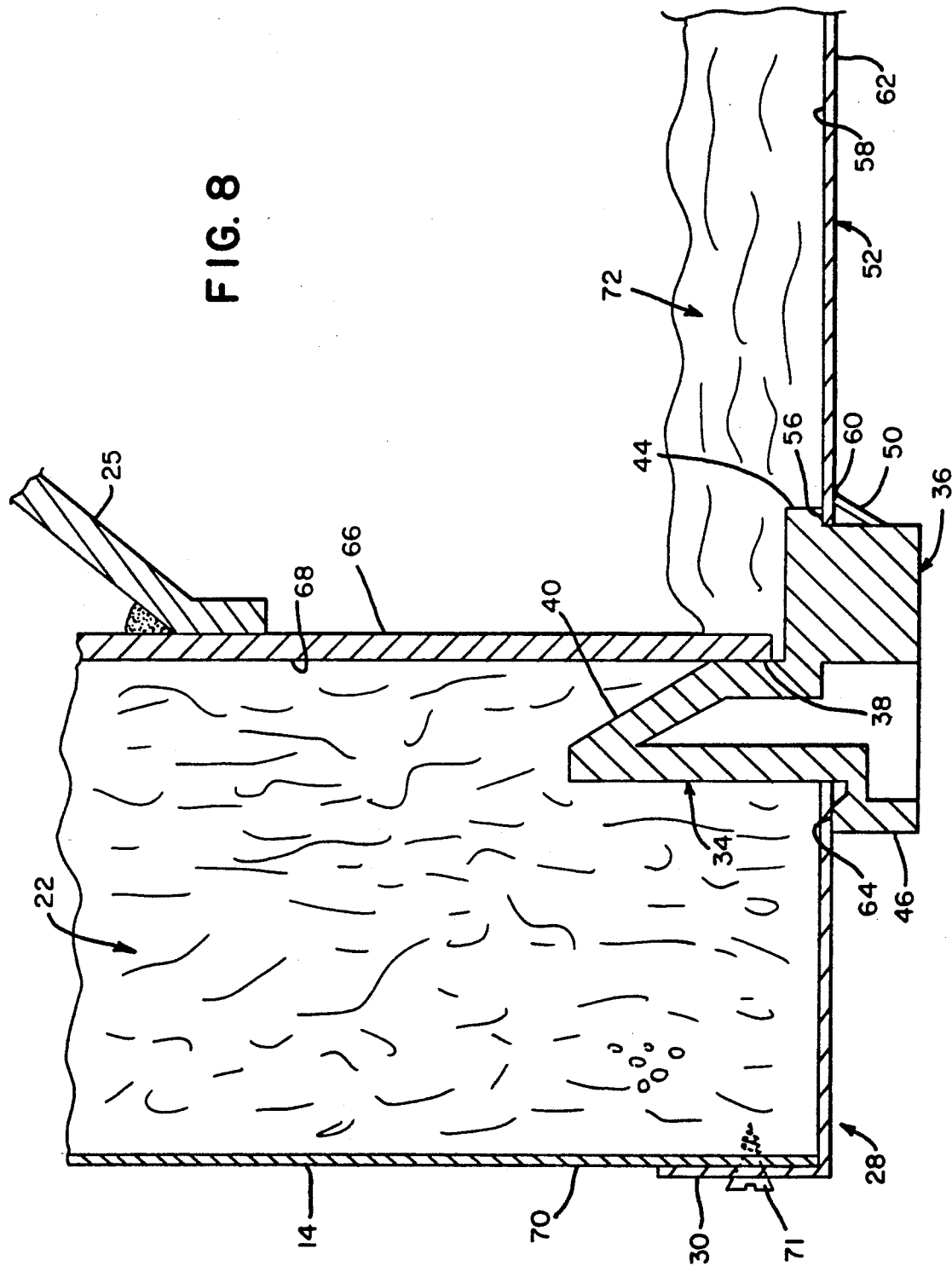
FIG. 8 is a partial cross-sectional view of a foot embodying features of this invention, taken along the lines and arrows VIII—VIII shown in FIG. 7.

FIG. 8 illustrates a completed sectional view of a preferred embodiment of the invention. Foot 32 extends through a hole previously cut in bottom plate 52 of base pan 28 (the hole 54 of FIG. 5). Upper surface 64 of pivot flange 46 engages lower surface 62 of bottom plate 52. Similarly, end 60 of flexible arm 50 engages lower surface 62. Undersurface 56 of flange 44 engages top surface 58 of bottom plate 52. Fiberglass, foam or other insulation 72 lies on top surface 58 of bottom plate 52. Outer wall 70 of outer jacket 14 engages retaining wall 30 of base pan 28. Screw 71 connects outer jacket 14 and retaining wall 30. Foam or other insulation lies between outer jacket 14 and edge lower edge 66 of water tank 24. Lower edge 66 of water tank 24 extends centering surface wall 38 of upper portion 34 of foot 32.

Although FIG. 8 illustrates a water tank having a lower edge 66 engaging centering surfaces walls 38, which is typical of gas water heaters, it is fully within the scope of this invention that the water tank may not have such a downwardly extending edge. Instead, the water tank may directly engage the centering surface walls 38 as is typical of electric water heaters. In such a case, the side wall of the water tank would engage the centering side walls 38 and the bottom of the water tank would preferably rest on retaining flange 44.

The nature and structure of the novel thermally efficient water heater of this invention will be further understood with respect to the manner in which it may be made. One method for constructing water heater 10 is described below in conjunction with all of the drawings. A base pan 28 having a solid bottom plate 52 is provided with three or more cut-outs 54 (FIG. 5) in equally spaced relation from on another. The cut-outs 54 are located equidistant from edge of base pan 28.

Feet 32 may be placed into each of cut-outs 54 in the following manner. Lower portion 36 of a foot 32 is inserted downwardly through cut-out 54 by tilting foot 32 out of vertical such that pivot flange 46 enters cut-out 54 first. Once pivot flange 46 has penetrated through cut-out 54, foot 32 is then pivoted (clockwise as viewed in FIG. 8) toward vertical and the upper surface 64 of pivot flange 46 comes into direct contact with lower surface 62 of bottom plate 52. Such tilting motion of the foot 32 causes the upper portion 34 of foot 32 also to pivot toward vertical. Pivoting action causes retaining flange 44 to engage the upper surface of bottom plate 52. Engagement is complete when the undersurface 56 of flange 44 directly contacts the top surface 58 of bottom plate 52.

During this pivoting action, flexible retaining arms 50 engage the edge of cut-out 54 as foot 32 pivots toward vertical. Flexible retaining arms 50, being made of a flexible material, flex inwardly toward the main body of foot 32 in a manner to permit lower portion 36 to continue pivoting downwardly through cut-out 54. As soon as ends 60 of flexible retaining arms 50 spring outwardly away from the main body of foot 32 into the configuration shown in FIG. 8. At that time end 60 closely contacts lower surface 62 and foot 32 is snapped into place. This procedure is followed in a manner to install as many feet 32 as there are cut-outs 54 in base pan 28.

Fiberglass or other insulation material 72 is then placed onto the top surface 58 of bottom plate 52. The fiberglass insulation material 72 is typically large enough to have essentially the same diameter as base pan 28. Fiberglass insulation 72 provides an insulating effect against heat radiating downwardly from tank 24.

In assembling the water heater the base pan 28 is laid flat, preferably on a special shipping carton (not shown) having slots spaced to receive feet 32. Placement of feet 32 in the shipping carton slots prevents shifting or sliding during the assembly process, as well as during shipping. The shipping carton is then preferably laid on the moving assembly line, and water tank 24 is positioned directly above it. Water tank 24 is then lowered onto base pan 28 by engaging lower edge 66 of water tank 24 with feet 32. The water tank is lowered and properly positioned when outer surface 68 of lower edge 66 contacts and engages centering surface wall 38 of each foot 32.

Since water heaters are often produced on quickly moving assembly lines, it is necessary rapidly to place the water tank 24 onto base pan 28. However, such placement must be achieved with accuracy to provide a well centered water tank. Otherwise the required heating efficiencies will not be achieved. Rapid placement of water tank 24 on base pan 28 is assisted by the presence of the angled guide walls 40 of the feet 32, which help to channel or funnel the lower edges 66 of the water tank into proper engagement concurrently with all of the centering surface walls 38 of the feet 32 in the event that water tank 24 moves either off center or pivots out of vertical during lowering. Moreover, placement of feet 32 into the shipping carton slot helps reduce lateral movements on the assembly which frequently results in poor jacket/water tank concentricity.

After water tank 24 is properly centered in place, outer jacket 14 is lowered thereover. Outer jacket 14, having an outer wall 70, is lowered into a position fitting just interiorly of the circumferential retaining wall 30 of the base pan 28. Base pan 28 and outer jacket 14 may be fixed to one another by any conventional means known in the art, such as by screws 71 between the jacket 14 and the flange 30.

After outer jacket 14 is secured to base pan 28 and water tank 24 is concentrically positioned within the centering walls 38 of the feet 32, foam forming materials are introduced into the concentrically shaped annular space 22 between outer jacket 14 and water tank 24. It is possible to utilize foaming aprons, such as disclosed in U.S. Pat. No. 4,808,356, to protect electrical or other components and still achieve optimal flow and coverage of the foam forming materials as they are introduced into the concentric space.

Preferably while the foam forming materials are expanding and flowing within the concentric space 22, the top cover 16 (FIG. 1) of the water heater is then lowered into place over outer jacket 14 and fixed thereto. It is, however, possible in the alternative to place top cover 16 into position over outer jacket 14 prior to introduction of foam forming materials through a foaming hole (not shown).

The novel structure disclosed herein provides many advantages not previously achieved by the prior art. This invention provides for mass production of highly thermally efficient water heaters by insuring that the space into which the foam forming materials are introduced between the water tank and outer jacket is concentrically formed prior to foaming and remains in the same concentric position even after exposure to variable forces applied during the foaming step. The result is a foam insulated layer having a consistent and uniform radial thickness around the entire circumference of the water tank.

The invention further provides the advantage that these excellent results can be achieved with ease not withstanding the various forces applied on a rapidly moving assembly line. No extra production personnel and no extra apparatus or steps, such as filling and attaching troublesome bags, are needed. Moreover, placement of the water tank onto the base pan is rendered practically effortless because of the self-guiding capability of the novel feet according to this invention.

The invention still further provides the advantage of elevating the water heater above the supporting surface in use. It is advantageous to position the base pan slightly above the floor, when installing the water heater at the customer's location, to aid in levelling the water heater, to deter corrosion of the base pan after extended periods of use and to provide a thermal break between the water heater and the floor. Since the novel feet of this invention maintain the bottom pan above the floor, air can pass underneath the bottom pan to allow drying of any moisture, thereby minimizing corrosion. Also, the novel feet of this invention ar preferably designed to provide enough height to overcome uneven floor surfaces, yet not so much as to cause instability or shipping problems. Engagement of the feet with the special shipping carton slots reduces shifting of the water heater during transport, which reduces the possibility of damage to the water heater between the factory and the point of installation. Moreover, the feet according to this invention are easily installed onto the base pan and provide the critical advantage of centering the water tank with respect to the outer jacket before, during and after foaming.

Although this invention has been described in connection with specific forms thereof, it will be appreciated that a wide variety of equivalents may be substituted for the specific elements shown and described herein without departing from the spirit and scope of this invention as described in the appended claims. For example, the bottom of the water tank itself may have various shapes, either with a lower edge portion 66 as shown in FIG. 8 or with an essentially cylindrical bottom construction of the type shown in the aforementioned U.S. Pat. No. 4,628,184. Various other modifications may be made, including the use of a variety of fiberglass or foam insulating materials, tank insulating or foaming techniques, and the use of jackets, tanks and bottom pans of various designs and shapes. Further, variations may be made in the sequence of steps of the method and in the number, size and shape of the novel spacer feet in accordance with this invention, all without departing from the spirit and scope of the invention as defined in the appended claims.

I claim:

1. In a method of producing an insulated water heater comprising a water tank having a bottom and a base pan having an outer retaining surface, said base pan having at least three feet attached thereto at locations essentially equidistant from a centering point and provided with upper portions extending above the bottom of the base pan and lower portions extending below the bottom of the base pan, the upper portions of said feet having downwardly inwardly inclined centering surfaces terminating immediately adjacent an outer circumference of said water tanks to receive, guide and center the bottom of the water tank in a centered position on base pan, the steps which comprise positioning the water tank above the base pan and above said feet;

lowering the water tank bottom upon at least one of the downwardly inwardly inclined centering surfaces of said feet, thereby positioning the water tank adjacent the base pan and laterally guiding the water tank into a centered position relative to the base pan;

positioning the outer jacket around the water tank and into engagement with the base pan retaining surface, thereby providing a space between the tank and the jacket and positioning the outer jacket into a centered position relative to the water tank and the base pan; and introducing insulation material into said space.

2. The method defined in claim 1 further comprising forming at least three cut-outs in the bottom of the base pan and inserting the feet into the cut-outs to position said upper and lower portions relative to the base pan.

3. The method defined in claim 2 wherein the feet are sized to fill the cut-outs, thereby creating a seal to prevent insulation material from extending outwardly through the bottom of the water heater.

4. The method defined in claim 1 wherein the centering surfaces have lower portions which are substantially vertically oriented.

5. The method defined in claim 1 wherein the centering surfaces have upper portions angled out of vertical.

6. The method defined in claim 1 further comprising applying insulation material on the base pan in between the feet.

7. The method defined in claim 1 wherein the insulation material is polyurethane foam.

8. The method defined in claim 1 further comprising applying a top cover over the outer jacket and the water tank.

9. The method defined in claim 1 wherein the base pan outer retaining surface and the centering surfaces are concentrically spaced.

10. An insulated water heater comprising:
    a water tank having water inlet and outlet lines and a bottom;
    a base pan having an upstanding circumferential edge, at least three spaced-apart concentrically arranged feet having upper portions extending above the bottom of the pan and lower portions extending below the bottom of the pan, said feet being located essentially equidistant form a centering point on said base pan, the upper portions of said feet having downwardly inwardly inclined centering surfaces terminating immediately adjacent an outer circumference of said water tank, the lower portion of the water tank engaging at least one of the inclined centering surface when assembling to urge the water tank and the pan into a substantially concentric position relative to one another;
    means connected for heating water in the water tank;
    an outer jacket positioned around the water tank and connected to the base pan circumferential edge to position the outer jacket in a centered position relative tot he water tank and the pan; and
    insulation material positioned within a space formed between the water tank and the outer jacket.

11. The water heater defined in claim 10 further comprising a top cover connected to an upper edge of the outer jacket.

12. The water heater defined in claim 10 wherein the insulation material is polyurethane foam.

13. The water heater defined in claim 10 further comprising insulation material positioned on the base pan in between the feet.

14. The water heater defined in claim 10 wherein said feet have substantially vertically oriented centering surface intersecting a lower terminal end of said downwardly inwardly inclined surfaces.

15. The water heater defined in claim 11 wherein the feet are sized to fill the cut-outs, thereby creating a seal and preventing insulation material from extending outwardly through the bottom of the water heater.

16. The water heater defined in claim 11 wherein the feet are made of an acetal.

17. The water heater defined in claim 11 wherein the upper portions of the feet include at least one retainer flange extending along the upper surface of the bottom of the base pan.

18. The water heater defined in claim 11 wherein the lower portions of the feet have a pivot flange extending along the lower surface of the bottom of the base pan and at least one flexible arm positioned opposite the pivot flange engaging the lower surface of the bottom of the base pan.

19. The water heater defined in claim 10 wherein the pan is laterally rigid and maintains the plurality of feet in predetermined spaced relation to each other.

20. An insulated water heater comprising:
a water tank having water inlet and outlet lines and a bottom with at lest three cut-outs;
a base pan having an upstanding circumferential edge;
a plurality of feet having upper portions extending above the bottom of the pan and lower portions extending below the bottom of the pan, the upper portions of the feet having centering surfaces positioned to engage a bottom portion of the water tank, the lower portions of the feet having a pivot flange extending along the lower surface of the bottom of the base of the pan and at least one flexible arm positioned opposite the pivot flange engaging the lower surface of the bottom of the base pan, the lower portion of the water tank engaging the centering surfaces to position the water tank and the pan into a substantially concentric position relative to one another;
means connected for heating water int eh water tank;
an outer jacket positioned around the water tank and connected to the base pan circumferential edge to position the outer jacket in a desired position relative to the water tank and the pan; and
insulation material positioned within a space formed between the water tank and the outer jacket.

21. An insulated water heater comprising:
a water tank having water inlet and outlet lines and a bottom;
a base pan having an upstanding circumferential edge;
at least three feet having upper portions extending above the bottom of the pan and lower portions extending below the bottom of the pan each of the upper portions of the feet having one downwardly inwardly inclined centering surface terminating immediately adjacent an outer circumference of said water tank when centered relative to said base pan and a portion which is angled out of vertical positioned to engage a bottom portion of the water tank;
means connected for heating water int eh water tank;
an outer jacket positioned around the water tank and connected to the base pan circumferential edge to position the outer jacket in a desired position relative to the water tank and the pan; and
insulation material positioned within a space formed between the water tank and the outer jacket.

* * * * *